United States Patent
Nakano

(10) Patent No.: US 10,719,956 B2
(45) Date of Patent: Jul. 21, 2020

(54) CAMERA PARAMETER ESTIMATION APPARATUS, CAMERA PARAMETER ESTIMATION METHOD, AND COMPUTER-READABLE RECORDING MEDIUM

(71) Applicant: NEC Corporation, Minato-ku, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/492,668

(22) PCT Filed: Feb. 5, 2018

(86) PCT No.: PCT/JP2018/003814
§ 371 (c)(1),
(2) Date: Sep. 10, 2019

(87) PCT Pub. No.: WO2018/168255
PCT Pub. Date: Sep. 20, 2018

(65) Prior Publication Data
US 2020/0051279 A1     Feb. 13, 2020

(30) Foreign Application Priority Data
Mar. 14, 2017   (JP) .................................. 2017-048915

(51) Int. Cl.
*H04N 5/232*   (2006.01)
*G06T 7/80*    (2017.01)
(Continued)

(52) U.S. Cl.
CPC .................. *G06T 7/80* (2017.01); *G06T 7/70* (2017.01); *H04N 5/232* (2013.01);
(Continued)

(58) Field of Classification Search
CPC ........ H04N 5/232; H04N 17/002; G06T 7/80; G06T 7/70; G06T 2207/10016; G06T 2207/30244
(Continued)

(56) References Cited

U.S. PATENT DOCUMENTS

| | | | |
|---|---|---|---|
| 2009/0021580 A1* | 1/2009 | Ishigami | G01C 11/02 348/142 |
| 2012/0002057 A1* | 1/2012 | Kakinami | G06T 7/85 348/187 |

FOREIGN PATENT DOCUMENTS

| | | |
|---|---|---|
| JP | 2010-250452 A | 11/2010 |
| JP | 2015-106287 A | 6/2015 |
| JP | 2017-163386 A | 9/2017 |

OTHER PUBLICATIONS

International Search Report in International Application No. PCT/JP2018/003814, dated Mar. 27, 2018.
(Continued)

*Primary Examiner* — Michael Lee

(57) ABSTRACT

A camera parameter estimation apparatus 10 estimates camera parameters when an object is photographed by a camera. The camera parameter estimation apparatus 10 is provided with: a parameter calculation unit 20 configured to divide an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and to calculate optimal solution candidates in the respective subproblems; and a parameter optimization unit 30 configured, with the optimal solution candidates as initial values, to find an optimal solution for minimizing an error obtained by the error function, and to output the found optimal solution as an optimal camera parameter.

12 Claims, 4 Drawing Sheets

(51) Int. Cl.
*G06T 7/70* (2017.01)
*H04N 17/00* (2006.01)

(52) U.S. Cl.
CPC . *H04N 17/002* (2013.01); *G06T 2207/10016* (2013.01); *G06T 2207/30244* (2013.01)

(58) Field of Classification Search
USPC ........................................................ 348/187
See application file for complete search history.

(56) References Cited

OTHER PUBLICATIONS

Zhengyou Zhang, "Flexible camera calibration by viewing a plane from unknown orientations", ICCV, 1999 (8 pages total).

Roger Y. Tsai, "A versatile camera calibration technique for high-accuracy 3D machine vision using off-the-shelf TV cameras and lenses", IEEE Journal of Robotics and Automation, Aug. 1987, vol. RA-3, No. 4, pp. 323-344 (22 pages total).

Gaku Nakano, "Globally Optimal DLS Method for PnP Problem with Cayley parameterization", BMVC, 2015, pp. 1-11 (11 pages total).

Yinqiang Zheng, et al., "A General and Simple Method for Camera Pose and Focal Length Determination", CVPR, 2014 (8 pages total).

Martin Bujnak, et al., "New efficient solution to the absolute pose problem for camera with unknown focal length and radial distortion", ACCV, 2010, pp. 1-14 (14 pages total).

Zuzana Kukelova, et al., "Real-time solution to the absolute pose problem with unknown radial distortion and focal length", ICCV, 2013, pp. 2816-2823 (8 pages total).

Gaku Nakano, "A Versatile Approach for Solving PnP, PnPf, and PnPfr Problems", ECCV, 2016, pp. 1-15 (15 pages total).

\* cited by examiner

CAMERA PARAMETER ESTIMATION APPARATUS, CAMERA PARAMETER ESTIMATION METHOD, AND COMPUTER-READABLE RECORDING MEDIUM

This application is a National Stage Entry of PCT/JP2018/003814 filed on Feb. 5, 2018, which claims priority from Japanese Patent Application 2017-048915 filed on Mar. 14, 2017, the contents of all of which are incorporated herein by reference, in their entirety.

TECHNICAL FIELD

The present invention relates to a camera parameter estimation apparatus and a camera parameter estimation method that estimate extrinsic parameters and intrinsic parameters of a camera, and further relates to a computer-readable recording medium where a program for realizing these is recorded.

BACKGROUND ART

Techniques for estimating camera parameters from images obtained by observing known three-dimensional points are important elemental techniques in robot self position estimation and image synthesis (see, for example, Non-Patent Documents 1 to 5). Also, there are two types of camera parameters: extrinsic parameters and intrinsic parameters. Extrinsic parameters are parameters that represent the position and rotation of a camera in a three-dimensional space, and intrinsic parameters are parameters such as a lens focal length, an optical center, an aspect ratio, a shear coefficient, and a lens distortion coefficient. Hereinafter, a pair of a known three-dimensional point and a two-dimensional point obtained by observing the three-dimensional point on an image will be referred to as simply a 'corresponding point'.

Both Non-Patent Document 1 and Non-Patent Document 2 disclose a method of calculating extrinsic parameters and intrinsic parameters using a plane where three-dimensional points of a surface pattern are known, or images obtained by photographing a solid pattern from a plurality of angles. In the methods disclosed in these non-patent documents, first all lens distortion coefficients are assumed to be zero, and the intrinsic parameters and the extrinsic parameters are calculated, ignoring constraining conditions related to rotation. Then, nonlinear optimization is performed by Newton's method or the like, using the intrinsic parameters and extrinsic parameters that were calculated as initial values.

Also, Non-Patent Document 3 discloses a method in which intrinsic parameters are calculated in advance using the methods disclosed in Non-Patent Document 1 and Non-Patent Document 2, and only extrinsic parameters are calculated from at least three sets of corresponding points. Specifically, in the method disclosed in Non-Patent Document 3, an error function based on a projection relationship between three-dimensional points and two-dimensional points is represented as a polynomial, and by calculating all zero points of slopes that are stationary points of the error function, local minimums are avoided and a globally optimal unique solution is estimated.

Furthermore, Non-Patent Document 4 discloses a method in which only the focal length is considered to be unknown among the intrinsic parameters, and similar to the method disclosed in Non-Patent Document 3, a globally optimal solution is directly calculated from a polynomial expression using at least four sets of corresponding points.

Also, Non-Patent Document 5 and Non-Patent Document 6 disclose methods in which, respectively using four sets or five sets of corresponding points as input, the focal length and the lens distortion coefficient are considered to be unknown among the intrinsic parameters, and both these intrinsic parameters and the extrinsic parameters are calculated.

Furthermore, Non-Patent Document 7 discloses a method in which the focal length and the lens distortion coefficient are considered to be unknown among the intrinsic parameters, and the intrinsic parameters and the extrinsic parameters are calculated using at least five sets of corresponding points. Specifically, the error function is divided into a plurality of subproblems based on dependency among the camera parameters, and in the respective subproblems, similar to the method disclosed in Non-Patent Document 3, a globally optimal solution is calculated from a polynomial expression.

LIST OF RELATED ART DOCUMENTS

Non-Patent Documents

Non-Patent Document 1: Z. Zhang, "Flexible camera calibration by viewing a plane from unknown orientations," ICCV 1999.
Non-Patent Document 2: R. Tsai, "A versatile camera calibration technique for high-accuracy 3D machine vision using off-the-shelf TV cameras and lenses," Robotics and Automation, IEEE Journal of 3.4 (1987): 323-344.
Non-Patent Document 3: G. Nakano, "Globally Optimal DLS Method for PnP Problem with Cayley parameterization," BMVC 2015.
Non-Patent Document 4: Y. Zheng, et al., "A General and Simple Method for Camera Pose and Focal Length Determination," CVPR 2014.
Non-patent document 5: M. Bujnak, et al., "New efficient solution to the absolute pose problem for camera with unknown focal length and radial distortion," ACCV 2010.
Non-patent document 6: Z. Kukelova, et al., "Real-time solution to the absolute pose problem with unknown radial distortion and focal length," ICCV 2013.
Non-Patent Document 7: G. Nakano, "A Versatile Approach for Solving PnP, PnPf, and PnPfr Problems," ECCV 2016.

SUMMARY OF INVENTION

Problems to be Solved by the Invention

However, in the methods disclosed in the above Non-Patent Documents 1 to 7, there are problems such as these described below. First, in the methods disclosed in Non-Patent Documents 1 and 2, several tens of images are required for stable calculation, and in the case of non-linear optimization, convergence to an undesirable local minimum may occur, resulting in a problem that the accuracy of estimating the intrinsic parameters and the extrinsic parameters is low.

Also, in the method disclosed in the above Non-Patent Document 3, there is a problem that a camera with a fixed focal length is assumed, and when a camera equipped with a zoom lens is used, it is not possible to estimate the intrinsic parameters and the extrinsic parameters. On the other hand, in the method disclosed in the above Non-Patent Document 4, there is a problem that although the focal length can be estimated when the zoom setting of a camera equipped with a zoom lens has been changed, this method is not compatible with a change in the lens distortion coefficient that occurs simultaneously with the change in the zoom setting. Therefore, in the method disclosed in the above Non-Patent Document 4 as well, there is the problem that the accuracy of estimating the intrinsic parameters and the extrinsic parameters is low.

Furthermore, in the methods disclosed in Non-Patent Document 5 and Non-Patent Document 6, commonly, a plurality of solutions are obtained, and it is not possible to uniquely select a solution, and additionally, it is not possible to estimate an optimal solution in the least squares sense with input of at least four sets or at least five sets of corresponding points. Therefore, in the method disclosed in Non-Patent Document 5 or the method disclosed in Non-Patent Document 6 as well, there is the problem that the accuracy of estimating the intrinsic parameters and the extrinsic parameters is low.

In addition, in the method disclosed in Non-Patent Document 7, it is possible to estimate an optimal solution in the least squares sense because input of at least five sets of corresponding points is used. However, in the method disclosed in Non-Patent Document 7, there is the problem that the numerical calculation method based on the polynomial expression is sensitive to noise, so a desirable solution that is originally a real number becomes a complex number, and therefore an incorrect globally optimal solution is selected.

In this way, in the methods disclosed in the above-described Non-Patent Documents 1 to 6, there is the problem that, from the plurality of corresponding points used as input, it is difficult to accurately estimate intrinsic parameters, which include the lens distortion coefficient as an unknown parameter, and the extrinsic parameters.

An example object of the present invention is to provide a camera parameter estimation apparatus, a camera parameter estimation method, and a computer-readable recording medium that address the above problems, such that it is possible to estimate intrinsic parameters, including the lens distortion coefficient, and extrinsic parameters in a numerically stable and highly accurate manner.

Means for Solving the Problems

In order to achieve the example object described above, a camera parameter estimation apparatus according to an example aspect of the present invention is an apparatus for estimating camera parameters when an object is photographed by a camera, the apparatus including:

a parameter calculation unit configured to divide an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and to calculate optimal solution candidates in the respective plurality of subproblems; and a parameter optimization unit configured, with the optimal solution candidates as initial values, to find an optimal solution for minimizing an error obtained by the error function, and to output the found optimal solution as an optimal camera parameter.

Also, in order to achieve the example object described above, a camera parameter estimation method according to an example aspect of the present invention is a method of estimating camera parameters when an object is photographed by a camera, the method including:

(a) a step of dividing an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and calculating optimal solution candidates in the respective plurality of subproblems; and (b) a step of, with the optimal solution candidates as initial values, finding an optimal solution for minimizing an error obtained by the error function, and outputting the found optimal solution as an optimal camera parameter.

Furthermore, in order to achieve the example object described above, a computer-readable recording medium according to an example aspect of the present invention includes a program recorded thereon for, with a computer, estimating camera parameters when an object is photographed by a camera, the program including instructions that cause the computer to carry out:

(a) a step of dividing an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and calculating optimal solution candidates in the respective plurality of subproblems; and (b) a step of, with the optimal solution candidates as initial values, finding an optimal solution for minimizing an error obtained by the error function, and outputting the found optimal solution as an optimal camera parameter.

Advantageous Effects of the Invention

As described above, according to the present invention, it is possible to estimate intrinsic parameters, including a lens distortion coefficient, and extrinsic parameters in a numerically stable and highly accurate manner.

EXAMPLE EMBODIMENT

First Example Embodiment

Following is a description of a camera parameter estimation apparatus, a camera parameter estimation method, and a program according to an example embodiment of the present invention, with reference to FIGS. 1 to 4.

[Apparatus Configuration]

Figure 1:
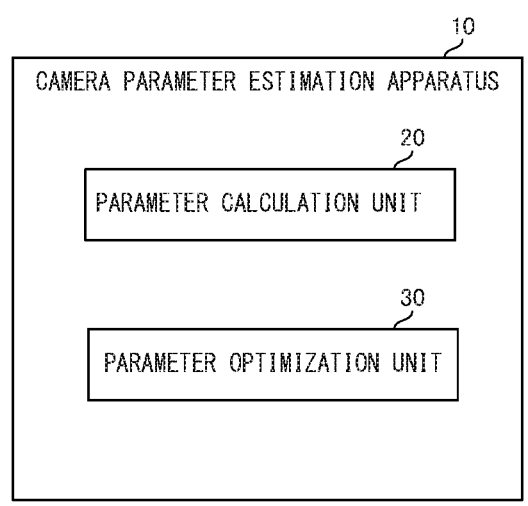
FIG. 1 is a block diagram showing a schematic configuration of a camera parameter estimation apparatus according to an example embodiment of the present invention.

First, the schematic configuration and functions of a camera parameter estimation apparatus according to this example embodiment of the present invention will be described with reference to FIG. 1. FIG. 1 is a block diagram showing the schematic configuration of the camera parameter estimation apparatus according to this example embodiment of the present invention.

A camera parameter estimation apparatus 10 in this example embodiment, shown in FIG. 1, is an apparatus for estimating camera parameters when an object is photographed by a camera. As shown in FIG. 1, the camera parameter estimation apparatus 10 is provided with a parameter calculation unit 20 and a parameter optimization unit 30.

The parameter calculation unit 20 first divides an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points. Next, the parameter calculation unit 20 solves the respective plurality of subproblems by a linear least squares method to calculate optimal solution candidates.

The parameter optimization unit 30 first, with the optimal solution candidates as initial values, finds an optimal solution for minimizing an error obtained by the error function. Next, the parameter optimization unit 30 outputs the found optimal solution as an optimal camera parameter.

In this way, in this example embodiment, the error function is divided into a plurality of subproblems, optimal parameter candidates are calculated based on the linear least squares method for the respective subproblems, and an optimal solution is calculated using the optimal parameter candidates that were calculated. Thus, according to this example embodiment, camera parameters, that is, intrinsic parameters, including the lens distortion coefficient, and extrinsic parameters are estimated in a numerically stable and highly accurate manner.

Figure 2:
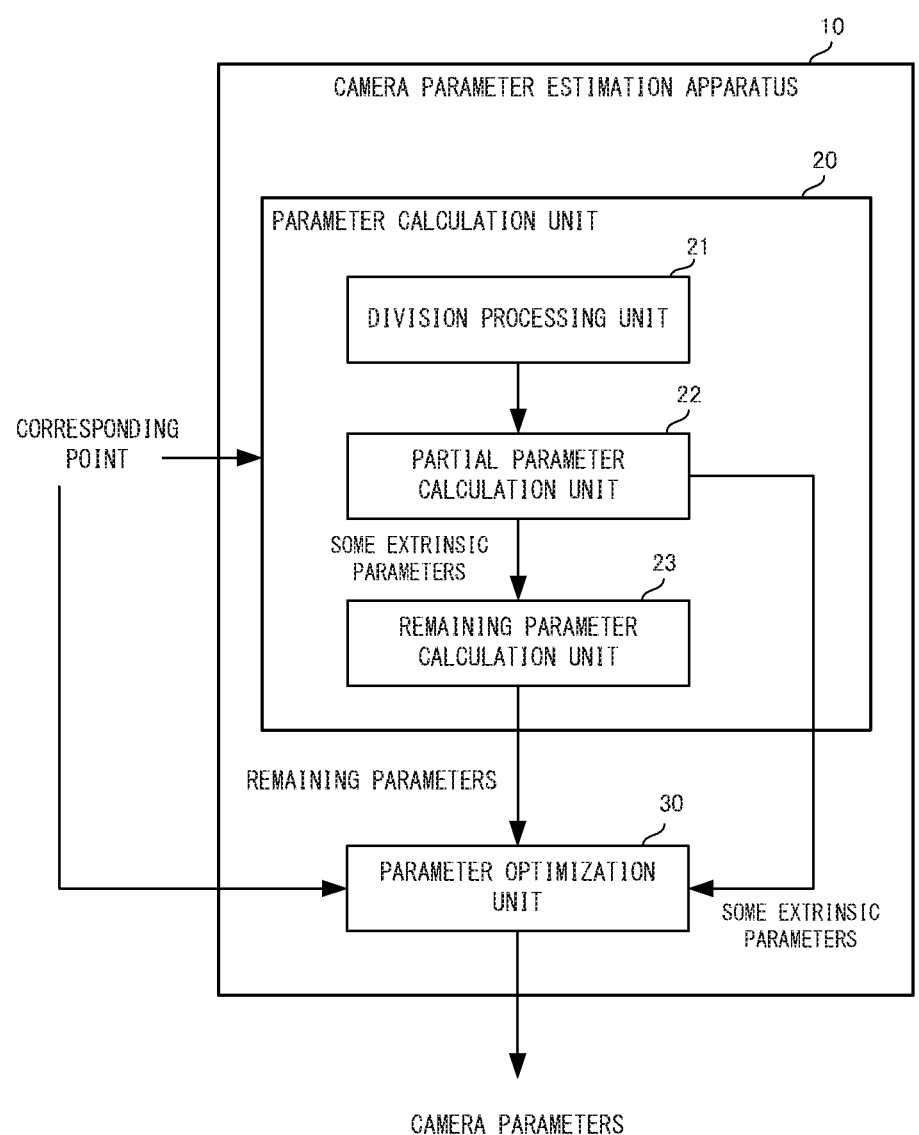
FIG. 2 is a block diagram showing a specific configuration of the camera parameter estimation apparatus according to an example embodiment of the present invention.

Next, the configuration and functions of the camera parameter estimation apparatus according to this example embodiment of the present invention will be more specifically described with reference to FIG. 2. FIG. 2 is a block diagram showing the specific configuration of the camera parameter estimation apparatus according to this example embodiment of the present invention.

As shown in FIG. 2, in this example embodiment, at least six sets of three-dimensional points relating to a photographed object, and two-dimensional points on an image that correspond to the respective three-dimensional points, are input as the above-described corresponding points to the camera parameter estimation apparatus 10.

In this example embodiment, the camera parameters include extrinsic parameters related to extrinsic aspects of the camera, and intrinsic parameters related to intrinsic aspects of the camera. Specifically, the extrinsic parameters include one or both of the position and the rotation of the camera in a three-dimensional space, as in the conventional technology. The intrinsic parameters include, in the camera, at least one of the lens focal length, the optical center, the aspect ratio, the shear coefficient, and the lens distortion coefficient. Note that in this example embodiment, the camera parameters may include only extrinsic parameters.

In this example embodiment, the camera parameter estimation apparatus 10 is an information processing apparatus that, based on at least six sets of corresponding points, estimates extrinsic parameters of the camera, and in addition to the extrinsic parameters of the camera, also estimates intrinsic parameters. Also, in this example embodiment, as shown in FIG. 2, the parameter calculation unit 20 is provided with a division processing unit 21, a partial parameter calculation unit 22, and a remaining parameter calculation unit 23.

The division processing unit 21 divides the error function representing a predetermined transformation between the three-dimensional points and the two-dimensional points included in the corresponding points into a plurality of subproblems based on dependency among the camera parameters and the flatness of distribution of the three-dimensional points.

Here, "dividing based on dependency among the camera parameters" means selecting, among a plurality of terms included in the error function, terms that are not affected or are only slightly affected by unknown parameters, for example selecting terms such that only the extrinsic parameters appear as variables, or selecting terms such that only the intrinsic parameters appear as variables.

Also, "dividing based on the flatness of distribution of the three-dimensional points" means switching the formulation of the subproblems according to whether the three-dimensional points included in the input are distributed on one plane, or are distributed on two or more planes, that is, according to whether or not the three-dimensional points are distributed in a non-planar manner.

The partial parameter calculation unit 22, using the plurality of corresponding points as input, among the plurality of subproblems, regarding one subproblem that depends on only some of the extrinsic parameters, calculates optimal solution candidates for some of the extrinsic parameters based on the linear least squares method.

The remaining parameter calculation unit 23, using the optimal solution candidates of some of the extrinsic parameters that were calculated by the partial parameter calculation unit 22 and the corresponding points as input, calculates solutions based on the linear least squares method for subproblems of parameters that have not yet been calculated.

In this example embodiment, the parameter optimization unit 30, using the optimal solution candidates that were calculated by the partial parameter calculation unit 22 and the remaining parameter calculation unit 23 and the corresponding points as input, based on this input, optimizes the original error function before the error function is divided, and thereby finds an optimal solution for minimizing an error. Then, the parameter optimization unit 30 outputs the found optimal solution as an optimal camera parameter.

[Apparatus Operation]

Figure 3:
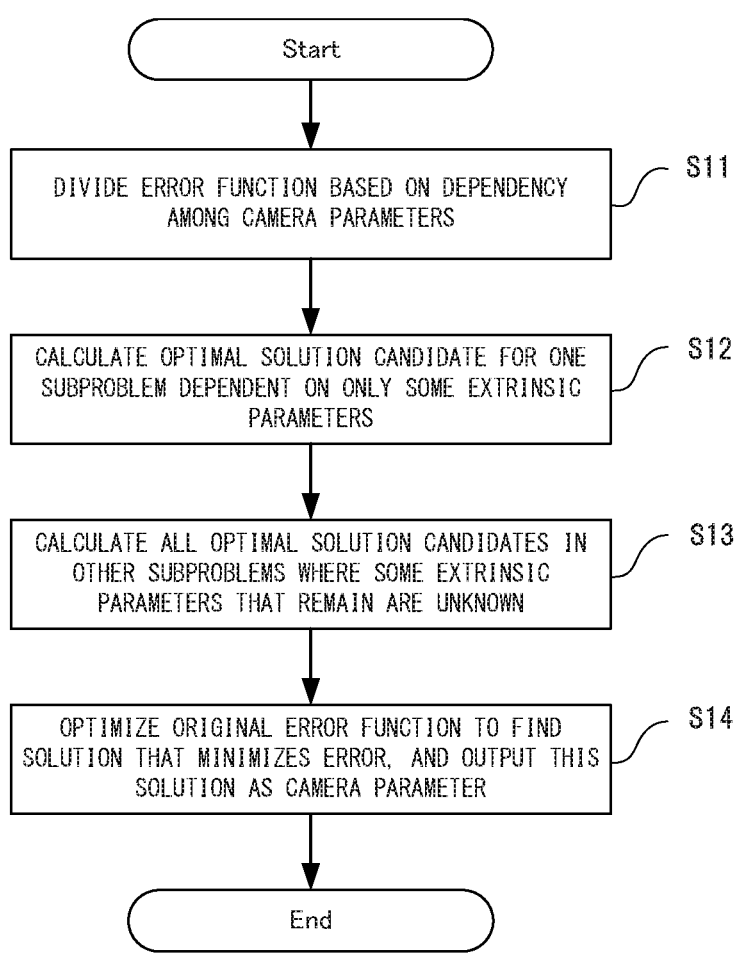
FIG. 3 is a flowchart showing operation of the camera parameter estimation apparatus according to an example embodiment of the present invention.

Next, operation of the camera parameter estimation apparatus 10 according to this example embodiment of the present invention will be described with reference to FIG. 3. FIG. 3 is a flowchart showing operation of the camera parameter estimation apparatus according to this example embodiment of the present invention. The following description refers to FIG. 1 as appropriate. Also, in this example embodiment, a camera parameter estimation method is implemented by operating the camera parameter estimation apparatus 10. Thus, the description of the camera parameter estimation method in this example embodiment can be replaced with the description of operation of the camera parameter estimation apparatus 10 below.

As shown in FIG. 3, first, when at least six sets of corresponding points are input to the camera parameter estimation apparatus 10, the division processing unit 21 divides an error function representing a predetermined transformation between the three-dimensional points and the two-dimensional points included in the corresponding points into a plurality of subproblems based on dependency among the camera parameters and the flatness of distribution of the three-dimensional points (step S11).

In this example embodiment, it is assumed that the corresponding points that are input are not in a so-called degenerate configuration (also called a critical configuration) in the camera parameters to be estimated. The reason for this is that camera parameters cannot be theoretically estimated for such corresponding points. Also, regarding coordinate values, it is assumed that all of the three-dimensional points and the two-dimensional points are different. The reason for this is that, for example, it is not realistically possible for one three-dimensional point to correspond to a plurality of different two-dimensional points. In the camera parameter estimation apparatus 10, these inappropriate corresponding points are excluded from subsequent processing. Also, in this example embodiment, a mode may also be adopted in which, instead of the camera parameter estimation apparatus 10, another apparatus (not shown) that inputs corresponding points from outside into the camera parameter estimation apparatus performs error determination or the like of the corresponding points.

Next, the partial parameter calculation unit 22 calculates an optimal solution candidate based on the linear least squares method for, among the subproblems that were obtained by performing division in step S11, one subproblem that depends on only some of the extrinsic parameters (step S12).

Here, 'optimal solution candidate' means a value close to a minimum stationary point of the error function to be minimized, that is, an appropriate initial value for minimizing the error function. Also, 'stationary point' means an unknown point at which a slope vector of an objective function (more accurately, a Lagrange function, but referred to below as simply an 'objective function') in the optimization problem is zero. That is, the stationary point is the solution of a simultaneous equation when the slope vector is considered to be a simultaneous equation. In step S12, the objective function refers to one subproblem that depends on only some of the extrinsic parameters, and the stationary point refers to an extrinsic parameter where the slope vector of the subproblem is zero. Also, the optimal solution candidate is not the stationary point itself, but refers to a value close to that stationary point.

Next, the remaining parameter calculation unit 23, using the corresponding points and the optimal solution candidates of some of the extrinsic parameters that were calculated in step S12 as input, calculates all of the optimal solution candidates in other subproblems where remaining camera parameters are unknown, that is, in subproblems where optimal solution candidates have not yet been calculated (step S13).

Here, the remaining camera parameters are camera parameters, excluding some extrinsic parameters, that depend on the subproblems for which optimal solution candidates were calculated in step S12. In the original error function before the error function is divided, all of the camera parameters are unknown, but in the subproblems in step S13, the optimal solution candidates (camera parameters) that were calculated in step S12 are treated as known constants. That is, in step S13, the remaining camera parameters that were not calculated in step S12 are calculated as stationary points of the subproblems that were not targeted in step S12.

Also, when there are a plurality of optimal solution candidates output in step S12, the remaining parameter calculation unit 23, with respect to each of the plurality of stationary points, calculates stationary points of the other subproblems. That is, for example, when K optimal solution candidates were calculated in step S12, in step S13, the other subproblems are solved K times.

Finally, the parameter optimization unit 30, using all of the optimal solution candidates that were output in steps S12 and S13 and the corresponding points as input, optimizes the original error function, finds the solution with the smallest error (the optimal solution), and outputs the found solution as a camera parameter (step S14).

In step S13, the parameter optimization unit 30 can also determine whether the input or output camera parameters are physically or theoretically meaningful. 'Physically meaningful' means, for example, that all of the three-dimensional points are required to exist in front of the camera. Therefore, the parameter optimization unit 30 may exclude inappropriate camera parameters such that some or all of the three-dimensional points exist behind the camera, or may invert the positive/negative sign of the camera parameters to correct the camera parameters such that the three-dimensional points exist in front of the camera. Also, when the range of values that some camera parameters can take is known in advance, the parameter optimization unit 30 may use this range as a threshold to exclude inappropriate input or output. For example, if the specifications of a zoom lens are known, the upper limit and the lower limit of the estimated focal length can be determined in advance, so the parameter optimization unit 30 excludes input or output that is outside of the upper limit and the lower limit.

'Theoretically meaningful' means, for example, that a calculation result does not satisfy quadratic optimality of the error function. When a calculated camera parameter does not satisfy quadratic optimality of the error function, the parameter optimization unit 30 excludes this camera parameter.

After inappropriate camera parameters are excluded in this way, the parameter optimization unit 30 outputs a solution that minimizes the error within the range of values that are physically or theoretically meaningful.

If a plurality of solutions that satisfy the above conditions exist and their errors can be regarded as the same, the parameter optimization unit 30 may output all of those solutions. In this case, there are a plurality of camera parameters to be output because a plurality of globally optimal solutions can be considered to exist.

Specific Example

Here, a specific example of this example embodiment will be described below. Note that, in the specific example below, position and rotation with three degrees of freedom respectively are used as extrinsic parameters. Also, because the focal length and the lens distortion coefficient are the parameters affected when the zoom setting is changed in the zoom lens, a focal length with one degree of freedom and a lens distortion coefficient with three degrees of freedom are used as intrinsic parameters.

The type of lens distortion is radial distortion, and a division model proposed by Andrew Fitzgibbon is used as the calculation model. Regarding other intrinsic parameters, the optical center is assumed to be at the center of the image (that is, half the size of the image), the aspect ratio is assumed to be 1, and the shear coefficient is assumed to be 0. These assumptions are also adopted in the above-mentioned Non-Patent Documents 4, 5, 6, and 7. Recent digital cameras are manufactured with high precision, so the above assumptions are reasonable.

However, which camera parameters are known or not known are not limited to these, and a person skilled in the art can freely change these according to the usage scene. This is also true regarding the type of lens distortion and the calculation model.

Also, in the following description, the superscript "T" represents transposition of a matrix and a vector, "0" represents a zero matrix and a zero vector, "I" represents an identity matrix, and "∥ ∥" represents an L2 norm of the vector. In the extrinsic parameters, the camera rotation is represented by a 3×3 rotation matrix R, and the camera position is represented by a 3×1 vector t. In the intrinsic parameters, the focal length is represented by "f", the reciprocal 1/f of the focal length is represented by "w", and the lens distortion coefficient is represented by a 3×1 vector "k". Also, the vector k is expressed by the following Equation 1.

$$k=[k_1,k_2,k_3]^T \quad \text{[Equation 1]}$$

The corresponding points are represented by n sets (n≥5) of input points, i-th three-dimensional coordinates are represented by "$X_i$", and two-dimensional coordinates homogenized by the division model are represented by "$m_i$". The two-dimensional coordinates $m_i$ are represented by the following Equation 2.

$$m_i=[u_i,v_i,1+k^T d]^T (d=[u_i^2+v_i^2,(u_i^2+v_i^2)^2,(u_i^2 v_i^2)^3]^T) \quad \text{[Equation 2]}$$

Also, the error function is defined. The error function represents a transformation relationship between $X_i$ and $m_i$, and is defined by the following Equation 3.

$$m_i \sim K(RX_i+t) \quad \text{[Equation 3]}$$

In the above Equation (3), "~" represents indefiniteness at a constant multiple. "K" is a 3×3 matrix where [1, 1, w] are diagonal components.

Also, from the above Equation 3, the error function for n sets of corresponding points is defined by the following Equation 4.

$$\min_{R,T,w,k} \sum_{i=1}^{n} \|[m_i]_\times K(RX_i+t)\|^2 \quad \text{[Equation 4]}$$
$$\text{s.t. } RR^T = I, \det(R) = 1$$

Here, $[m_i]_\times$ is a 3×3 distorted symmetric matrix indicating the outer product of vectors, and specific components are represented by the following Equation 5.

$$[m_i]_\times = \begin{bmatrix} 0 & -(1+k^T d) & v_i \\ 1+k^T d & 0 & -u_i \\ v_i & -u_i & 0 \end{bmatrix} \quad \text{[Equation 5]}$$

The above Equation 4 is called an algebraic error, and requires that the vector directions of both sides of the above Equation 3 are close to each other.

Next, a subproblem is defined. Assuming that the row vector of $[m_i]_\times$ is as shown in the following Equations 6 to 8, the above Equation 4 is equivalent to the following Equation 9. Note that a description of constraining conditions is omitted.

$$a_i^T = [0, -(1+k^T d), v_i] \quad \text{[Equation 6]}$$

-continued $$b_i^T = [1+k^T d, 0, -v_i] \quad \text{[Equation 7]}$$

$$c_i^T = [v_i, -u_i, 0] \quad \text{[Equation 8]}$$

$$\min_{R,T,w,k} \sum_{i=1}^{n} \left((a_i^T K(RX_i+t))^2 + (b_i^T K(RX_i+t))^2 + (c_i^T K(RX_i+t))^2\right) \quad \text{[Equation 9]}$$

Here, when each term of the above Equation 9 is regarded as an independent optimization problem, three subproblems represented by the following Equations 10 to 12 (omitting a description of constraining conditions) are obtained.

$$\min_{R,T,w,k} \sum_{i=1}^{n} (a_i^T K(RX_i+t))^2 \quad \text{[Equation 10]}$$

$$\min_{R,T,w,k} \sum_{i=1}^{n} (b_i^T K(RX_i+t))^2 \quad \text{[Equation 11]}$$

$$\min_{R,T,w,k} \sum_{i=1}^{n} (c_i^T K(RX_i+t))^2 \quad \text{[Equation 12]}$$

Next, a specific solution of each subproblem will be described. First, focusing on the above Equation 12, the following Equation 13 is established, so the above Equation 12 can be represented by the following Equation 14.

$$c_i^T K = c_i^T \quad \text{[Equation 13]}$$

$$c_i^T K(RX_i+t) = c_i^T(RX_i+t) = [v_i, -u_i]\begin{bmatrix} r_1^T X_i + t_1 \\ r_2^T X_i + t_2 \end{bmatrix} \quad \text{[Equation 14]}$$

In the above Equation 14, $r_j^T$ is the j-th row of R, and $t_j$ is the j-th component of t. Also, the above Equation 14 does not include intrinsic parameters, and is expressed only by extrinsic parameters except for $t_3$. Also, considering the constraining conditions regarding R, the degree of freedom of $\{r_1, r_2, t_1, t_2\}$ is 5 degrees of freedom, so if the number of corresponding points n is at least six sets, the above Equation 12 can be solved. Also, the above Equation 12 can be expressed by the following Equation 15 using the above Equation 14.

$$\min_{r_1,r_2,t_1,t_2} [r_1^T, r_2^T] M \begin{bmatrix} r_1^T \\ r_2^T \end{bmatrix}, \begin{bmatrix} t_1 \\ t_2 \end{bmatrix} = -(B^T B)^{-1} BA \begin{bmatrix} r_1^T \\ r_2^T \end{bmatrix} \quad \text{[Equation 15]}$$

Here, A, B, and M are n×6, n×2, and 6×6 matrices including $u_i$, $v_i$, and $X_i$. A detailed derivation method regarding these is disclosed in the above Non-Patent Document 7, so a description of that derivation method is omitted here.

When solving the above Equation 15 by the linear least squares method, the solution differs depending on whether all of the three-dimensional points are distributed on one plane, and depending on the number of points. This is because in the common case where the input includes noise, there are four levels of the matrix M in a case where the three-dimensional points are distributed on one plane and there are at least six three-dimensional points, and there are five levels of the matrix M in a case where the three-dimensional points are distributed on at least two planes and there are at least six three-dimensional points, and there are six levels of the matrix M in a case where there are at least seven three-dimensional points. For example, considering a case where the three-dimensional points are distributed on a plane of z=0, it can be proved from the above Equation 14 that there are four levels. An arbitrary plane can be transformed to a plane of z=0 by rigid body transformation, so there are four levels of the matrix M for all planes.

It is possible to determine whether or not all of the three-dimensional points are distributed on one plane using the following Equation 16, for example.

$$\det\left(\sum_{i=1}^{n}(X_i - Y)(X_i - Y)^T\right)$$ [Equation 16]

Here, Y is the center of gravity of all of the three-dimensional points, and det ( ) is a function that calculates a determinant. In a case where all of the three-dimensional points are distributed on one plane, at least three of the three-dimensional points are subordinate to each other, so the above Equation 16 is theoretically 0. Actually, a small amount of noise is included in the calculation accuracy and the three-dimensional points, so the above Equation 16 does not become perfectly zero. Therefore, if Equation 16 becomes a threshold value or less that is decided beforehand, it is determined that all of the three-dimensional points are distributed on one plane.

Next, a specific method of solving the above Equation 15 by the linear least squares method will be described. First, a case will be described where the three-dimensional points are distributed on two or more planes, that is, a case where it is determined by the above Equation 16 that the three-dimensional points are not distributed in a non-planar manner. At this time, with regard to the variable vector $[r_1^T, r_2^T]$, when a nontrivial constraint condition that the vector is not a zero vector is introduced while ignoring the constraint conditions of the rotation matrix, the variable vector has five degrees of freedom.

Also, in a case where the number of corresponding points is at least seven points, there are six levels of the matrix M, so the variable vector $[r_1^T, r_2^T]$ that minimizes the above Equation 15 can be formulated as the common linear least squares method, and can be calculated as an eigenvector that corresponds to a minimum eigenvalue of M. Also, in a case where the three-dimensional points are not distributed on one plane and there are six corresponding points, there are five levels of the matrix M, and the variable vector $[r_1^T, r_2^T]$ that minimizes the above Equation 15 is represented as a linear sum of two orthogonal basis vectors that represent null space of the matrix M. For example, when the two orthogonal basis vectors are written as $v_1$ and $v_2$ and the coefficient is written as a, $[r_1^T, r_2^T]=a*v_1+v_2$. Using a constraining condition that the norms of $r_1$ and $r_2$ are equally orthogonal, the coefficient a can be calculated and the variable vector $[r_1^T, r_2^T]$ can be decided. Then, $r_3$ can be calculated after estimation of $r_1$ and $r_2$ as an outer product of $r_1$ and $r_2$. The rotation matrix thus obtained does not commonly satisfy the constraining condition expressed by the above Equation 4. Therefore, a technique of using singular value decomposition to correct to a rotation matrix that satisfies a constraining condition is widely known.

Next is described a specific solution for solving the above Equation 15 by the linear least squares method in a case where the three-dimensional points are distributed on one plane. Here, for simplicity, it is assumed that all of the three-dimensional points are distributed on a plane of z=0.

An arbitrary plane can be transformed to a plane of z=0 by rigid body transformation, so the plane may be transformed to a plane of z=0 in a case where the determinant is determined to be 0 in the above Equation 16. As described above, there are four levels of the matrix M in a case where the three-dimensional points are distributed on one plane, and furthermore, in the case of a plane of z=0, the components of the third column, the sixth column, the third row, and the sixth row of the matrix M are all 0. Assuming that a 4×4 matrix from which the nonzero components of the matrix M have been extracted is represented as N, and the first and second components of $r_1$ and $r_2$ are represented as $p_1$ and $p_2$, respectively, the first term of the above Equation 15 is represented by the following Equation 17. Also, a variable vector included in the following Equation 17 is defined as shown in the following Equation 18.

$$\min_{p_1, p_2} [p_1^T, p_2^T]\hat{M}\begin{bmatrix} p_1^T \\ p_2^T \end{bmatrix}$$ [Equation 17]

$$R = [p_1^T, p_2^T]$$ [Equation 18]

In the above Equation 17, the variable vector R is four-dimensional and there are four levels of the matrix M, so the variable vector R that minimizes the above Equation 17 can be calculated by the linear least squares method, same as in the case where the three-dimensional points are distributed on non-planar manner. In order to calculate the third component of $r_1$ and $r_2$ respectively, which has not been estimated, the orthogonality of the rotation matrix may be used. For example, this calculation may be performed as follows. Assuming the i-th row j-column component of the rotation matrix is written as $r_{ij}$, the third row third column component can commonly be calculated as $r_{33}=r_{11}r_{22}-r_{12}r_{21}$. Here, the remaining unknowns $r_{13}$, $r_{23}$, $r_{31}$ and $r_{32}$ satisfy the constraining condition of orthogonality expressed by the following Equation 19.

$$RR^T=I, R^TR=I$$ [Equation 19]

The components of the first row third column and the second row third column of the first and second formulas of the above Equation 19 are linear first order equations for $r_{13}$, $r_{23}$, $r_{31}$, and $r_{32}$, so by solving Equation 19 it is possible to calculate $r_{13}$, $r_{23}$, $r_{31}$, and $r_{32}$ which have scale indeterminacy, and using the diagonal components of the first and second formulas, it is possible to calculate scale for all of $r_{ij}$ by the linear least squares method, and thus it is possible to estimate a rotation matrix where scale indeterminacy has been removed.

For example, a simultaneous equation represented by the following Equation 20 may be solved.

$$\begin{cases} p_1^T p_2 + r_{13} r_{23} = 0 \\ p_1^T p_1 + r_{13}^2 - (p_1^T p_2 + r_{23}^2) = 0 \end{cases}$$ [Equation 20]

The above Equation 20 is a quartic equation for $r_{13}$ or $r_{23}$, so up to four solutions can be obtained. After all of the components of $r_1$ and $r_2$ have been found, all components of the rotation matrix can be calculated by performing normalization such that the norm is 1, and calculating $r_3$ as an outer product of $r_1$ and $r_2$. The above Equation 20 is based on row direction orthogonality, but can be calculated similarly using column direction orthogonality.

Consequently, same as in the case where the three-dimensional points are distributed in a non-planar manner, it is possible to use singular value decomposition to correct to a rotation matrix that satisfies a constraining condition.

Above, there is described a method of calculating $r_1$ and $r_2$ in the above Equation 15 in a case where the three-dimensional points are distributed either on one plane or in a non-planar manner. It is possible to calculate $t_1$ and $t_2$ of the above Equation 15 by substituting the calculated $r_1$ and $r_2$ into the second term of the above Equation 15.

The method of calculating the remaining parameters $t_3$, w, and $k=[k_1, k_2, k_3]$ by the linear least squares method is described in detail in the above-mentioned Non-Patent Document 7, so a description of that method is omitted here.

In this way, all of the camera parameters can be estimated, but these are solutions to the subproblems represented by the above Equations 10 to 12. Consequently, if the above Equations 4 to 9 are solved by performing a nonlinear optimization method such as Newton's method using these as initial values, it is possible to ultimately estimate optimal camera parameters.

Next, the above specific example will be described while following along steps S11 to S14 shown in FIG. 3.

[Step S11]

First, in step S11, the division processing unit 21 divides the error function represented by the above Equation 9 into the subproblems of the above Equations 10, 11, and 12.

[Step S12]

Next, in step S12, the partial parameter calculation unit 22 solves the subproblem represented by the above Equation 12 as a linear least squares problem, and outputs the solution. The partial parameter calculation unit 22 may first determine whether all of the three-dimensional points are on one plane or are not on one plane based on the above Equation 16, and calculate a solution for whether the three-dimensional points are planar or non-planar based on the determination result, or the partial parameter calculation unit 22 may, without performing such a determination or regardless of the result of such a determination, calculate a plurality of solutions regarding both a case where all of the three-dimensional points are on one plane and a case where they are not on one plane. Also, when there are a plurality of solutions, the partial parameter calculation unit 22 may output all of the solutions, or may output only one solution that minimizes the above Equation 12.

[Step S13]

Next, in step S13, the remaining parameter calculation unit 23, using some of the extrinsic parameters that were calculated by the partial parameter calculation unit 22 as input, solves remaining parameters, that is, remaining extrinsic parameters and intrinsic parameters, by the linear least squares method and outputs the result. In a case where there are a plurality of solutions calculated in step S12, and a plurality of solutions were input, the remaining parameter calculation unit 23 calculates the remaining parameters for each of the solutions that were input. At this time, the partial parameter calculation unit 22 may output all of the parameters, or the partial parameter calculation unit 22 may output only one solution that minimizes either of the above Equation 4 and the subproblem.

[Step S14]

Finally, in step S14, the parameter optimization unit 30, using at least one set of camera parameters that were output by the partial parameter calculation unit 22 and the remaining parameter calculation unit 23 as initial values, outputs an optimal solution for minimizing an error by the nonlinear optimization of the above Equation 4. After execution of step S14, the camera parameter estimation apparatus 10 stops operation.

Also, a configuration may be adopted in which, in step S14, the parameter optimization unit 30 calculates the error in the above Equation 4 using the input parameters before optimization, and if the error is a threshold value or less, the input parameters are output as-is without optimization. Also, in step S14, as the error function, other than the above Equation 4, a so-called reprojection error function that represents a physical distance may be adopted. In this case, although calculation time is longer than in the case of optimizing the above Equation 4, it is possible to obtain a more accurate solution.

Effects According to Example Embodiment

As described above, according to this example embodiment, it is possible to estimate intrinsic parameters, including the lens distortion coefficient, and extrinsic parameters in a numerically stable and highly accurate manner. The reasons for this are as described below.

The above Equations 4 and 9 indicate that the directions of the two vectors $m_i$ and K $(RX_i+t)$ become close. In other words, assuming that the optimal solutions of the above Equations 4 and 9 are obtained, it is expected that each component of the vector represented by $[m_i]_x$ K $(RX_i+t)$ will respectively be close to 0. Therefore, even if, instead of directly solving the above Equation 9, this equation is solved by treating each term of the above Equation 9 as an independent constrained optimization problem (the subproblems of the above Equations 10 to 12), the respective optimal solutions are considered to be very close to the optimal solution of the above Equation 9, which is the original problem.

Furthermore, although the amount of calculation usually increases depending on the number of unknowns, in this example embodiment, by solving in order from a subproblem that depends on only an extrinsic parameter (the above Equation 12), it is possible to execute processing with a low amount of computation that is equal to or less than the conventional method.

Also, in the conventional method, the above Equation 4 or Equation 12 is formulated as a polynomial problem including a constraining condition, and a solution is calculated using a numerically unstable method based on eigenvalue decomposition, but in this example embodiment, after formulation as a linear least squares problem ignoring some constraining conditions, and finding a solution by the numerically stable linear least squares method, correction is performed so as to satisfy the constraining conditions. For the above reasons, according to this example embodiment, the intrinsic parameters and the extrinsic parameters are estimated in a numerically stable and highly accurate manner.

Modified Examples

This example embodiment is not limited to the example described above. In this example embodiment, various modifications understandable by those skilled in the art can be made to the example described above. For example, this example embodiment can also be embodied through modes disclosed in the following modified examples.

First Modified Example

In this example embodiment, the intrinsic parameters treated as unknown are not particularly limited. For example, as disclosed in Non-Patent Document 4, when the intrinsic parameter to be estimated is only the focal length, the above Equation 17 may be solved with k=0. Also, as disclosed in Non-Patent Document 3, when all of the intrinsic parameters are known, the above Equation 17 may be solved with k=0 and w=1/f. In this first modified example as well, regardless of how the unknown intrinsic parameters are set, after calculating some of the extrinsic parameters by the above Equation 12, it is not necessary to change the method of estimating the remaining parameters.

Second Modified Example

In this example embodiment, the camera parameter estimation apparatus 10 may include an extrinsic parameter input unit in order to receive some extrinsic parameters from outside. The extrinsic parameter input unit, for example, may receive a sensor value specifying an acceleration in the direction of gravity from an extrinsic acceleration sensor, or may receive a sensor value specifying an angular velocity from a gyro sensor. In the latter case, the extrinsic parameter input unit calculates a rotation matrix, and inputs the obtained rotation matrix to the parameter calculation unit 20. In this second modified example, the number of extrinsic parameters to be estimated decreases. However, in this second modified example as well, after calculating unknown extrinsic parameters by the above Equation 12, it is not necessary to change the method of estimating the remaining intrinsic parameters.

Third Modified Example

In this example embodiment, the extrinsic parameters are not limited to the position and rotation of the camera. For example, when an object moving in front of a stationary camera is photographed, a parameter representing the position and rotation of the object is estimated as an extrinsic parameter. This phenomenon is relatively equivalent whether the camera or the object moves, so the problem to be solved does not change.

Fourth Modified Example

In this example embodiment, the camera used for photographing is not limited to a monocular camera. In the above Equation 3, the transformation relationship between $X_i$ and $m_i$ is described using a so-called monocular pinhole camera model, but in this example embodiment, a common camera model with a plurality of focal points may be used. If the focal position is known in advance, camera parameters can be estimated using a similar method as in the above-described examples.

[Program]

A program according to this example embodiment may be a program that causes a computer to execute steps S11 to S14 shown in FIG. 3. By installing this program in the computer and executing the program, the camera parameter estimation apparatus 10 and the camera parameter estimation method according to this example embodiment can be realized. In this case, a processor of the computer performs processing to function as the parameter calculation unit 20 and the parameter optimization unit 30.

Also, the program according to this example embodiment may be executed by a computer system constructed using a plurality of computers. In this case, for example, each computer may respectively function as either of the parameter calculation unit 20 and the parameter optimization unit 30.

[Physical Configuration]

Figure 4:
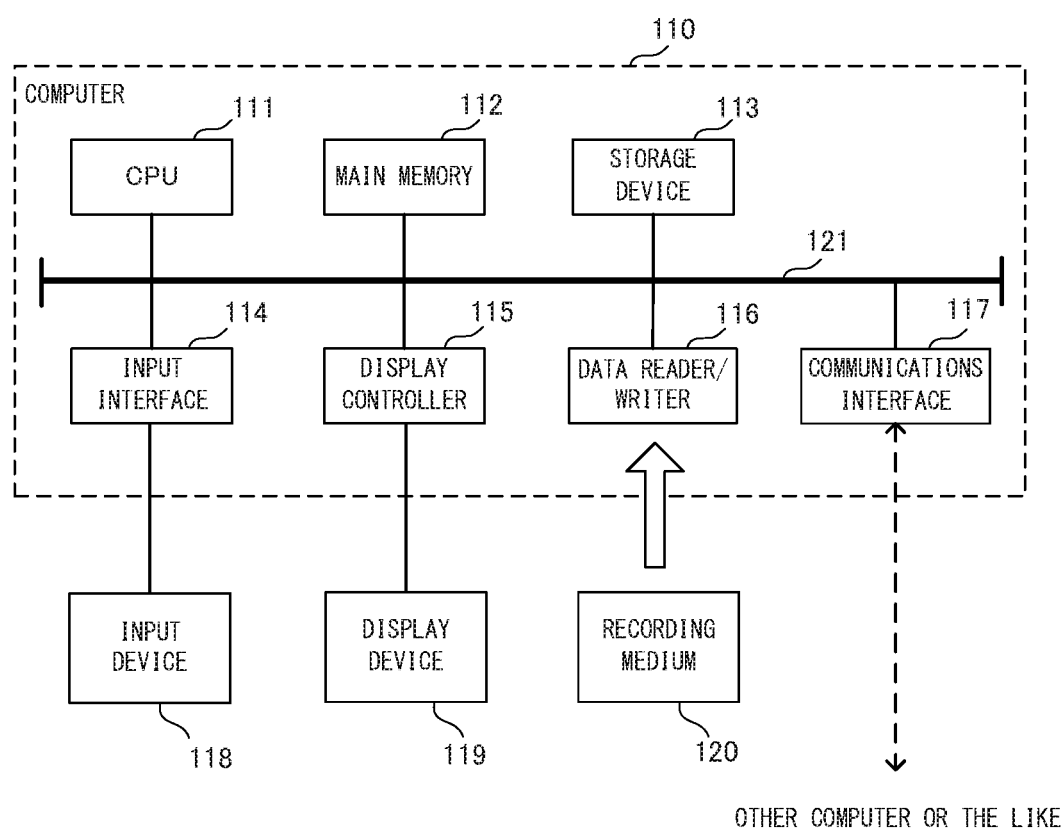
FIG. 4 is a block diagram showing an example of a computer that realizes the camera parameter estimation apparatus according to an example embodiment of the present invention.

Here, a computer that realizes the camera parameter estimation apparatus 10 by executing the program according to this example embodiment will be described with reference to FIG. 4. FIG. 4 is a block diagram showing an example of a computer that realizes the camera parameter estimation apparatus 10 according to an example embodiment of the present invention.

As shown in FIG. 4, the computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may also include a GPU (Graphics Processing Unit) or an FPGA (Field-Programmable Gate Array) in addition to the CPU 111 or instead of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display by the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Note that the camera parameter estimation apparatus 10 according to this example embodiment can be realized not only by a computer with a program installed, but also by using hardware corresponding to each part. Further, a configuration may be adopted in which a portion of the camera parameter estimation apparatus 10 is realized by a program, and the remaining portions are realized by hardware. Also, in the camera parameter estimation apparatus 10, each unit may be realized as a separate unit.

Some portion or all of the example embodiments described above can be realized according to (supplementary note 1) to (supplementary note 12) described below, but the below description does not limit the present invention.

(Supplementary Note 1)

A camera parameter estimation apparatus for estimating camera parameters when an object is photographed by a camera, the camera parameter estimation apparatus including:

a parameter calculation unit configured to divide an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and to calculate optimal solution candidates in the respective plurality of subproblems; and a parameter optimization unit configured, with the optimal solution candidates as initial values, to find an optimal solution for minimizing an error obtained by the error function, and to output the found optimal solution as an optimal camera parameter.

(Supplementary Note 2)

The camera parameter estimation apparatus according to supplementary note 1, wherein the camera parameters include extrinsic parameters related to the outside of the camera, the parameter calculation unit calculates an optimal solution candidate for, among the plurality of subproblems, one subproblem that depends on only some of the extrinsic parameters, and the parameter calculation unit also calculates, based on the optimal solution candidates that were calculated and the three-dimensional points and the two-dimensional points, optimal solution candidates for subproblems for which optimal solution candidates have not yet been calculated.

(Supplementary Note 3)

The camera parameter estimation apparatus according to supplementary note 1 or 2, wherein the parameter optimization unit, based on the optimal solution candidates that were calculated by the parameter calculation unit and the three-dimensional points and the two-dimensional points, finds an optimal solution for minimizing the error by optimizing the error function.

(Supplementary Note 4)

The camera parameter estimation apparatus according to supplementary note 2, wherein the extrinsic parameters include either one or both of position and rotation in a three-dimensional space of the camera, and the camera parameters include, in addition to the extrinsic parameters, intrinsic parameters related to the inside of the camera, and the intrinsic parameters include at least one of, in the camera, a lens focal length, an optical center, an aspect ratio, a shear coefficient, and a lens distortion coefficient.

(Supplementary Note 5)

A camera parameter estimation method of estimating camera parameters when an object is photographed by a camera, the camera parameter estimation method including:

(a) a step of dividing an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and calculating optimal solution candidates in the respective plurality of subproblems; and (b) a step of, with the optimal solution candidates as initial values, finding an optimal solution for minimizing an error obtained by the error function, and outputting the found optimal solution as an optimal camera parameter.

(Supplementary Note 6)

The camera parameter estimation method according to supplementary note 5, wherein the camera parameters include extrinsic parameters related to the outside of the camera, and in the (a) step, an optimal solution candidate is calculated for, among the plurality of subproblems, one subproblem that depends on only some of the extrinsic parameters, and also, based on the optimal solution candidates that were calculated and the three-dimensional points and the two-dimensional points, optimal solution candidates are calculated for subproblems for which optimal solution candidates have not yet been calculated.

(Supplementary Note 7)

The camera parameter estimation method according to supplementary note 5 or 6, wherein in the (b) step, an optimal solution for minimizing the error is found by optimizing the error function based on the optimal solution candidates that were calculated in the (a) step and the three-dimensional points and the two-dimensional points.

(Supplementary Note 8)

The camera parameter estimation method according to supplementary note 6, wherein the extrinsic parameters include either one or both of position and rotation in a three-dimensional space of the camera, and the camera parameters include, in addition to the extrinsic parameters, intrinsic parameters related to the inside of the camera, and the intrinsic parameters include at least one of, in the camera, a lens focal length, an optical center, an aspect ratio, a shear coefficient, and a lens distortion coefficient.

(Supplementary Note 9)

A computer-readable recording medium that includes a program recorded thereon for, with a computer, estimating camera parameters when an object is photographed by a camera, the program including instructions that cause the computer to carry out:

(a) a step of dividing an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and calculating optimal solution candidates in the respective plurality of subproblems; and (b) a step of, with the optimal solution candidates as initial values, finding an optimal solution for minimizing an error obtained by the error function, and outputting the found optimal solution as an optimal camera parameter.

(Supplementary Note 10)

The computer-readable recording medium according to supplementary note 9, wherein the camera parameters include extrinsic parameters related to the outside of the camera, and in the (a) step, an optimal solution candidate is calculated for, among the plurality of subproblems, one subproblem that depends on only some of the extrinsic parameters, and also, based on the optimal solution candidates that were calculated and the three-dimensional points and the two-dimensional points, optimal solution candidates are calculated for subproblems for which optimal solution candidates have not yet been calculated.

(Supplementary Note 11)

The computer-readable recording medium according to supplementary note 9 or 10, wherein in the (b) step, an optimal solution for minimizing the error is found by optimizing the error function based on the optimal solution candidates that were calculated in the (a) step and the three-dimensional points and the two-dimensional points.

(Supplementary Note 12)

The computer-readable recording medium according to supplementary note 10, wherein the extrinsic parameters include either one or both of position and rotation in a three-dimensional space of the camera, and the camera parameters include, in addition to the extrinsic parameters, intrinsic parameters related to the inside of the camera, and the intrinsic parameters include at least one of, in the camera, a lens focal length, an optical center, an aspect ratio, a shear coefficient, and a lens distortion coefficient.

Although the present invention is described above with reference to example embodiments, the present invention is not limited by the above example embodiments. Within the scope of the present invention, various modifications understandable by those skilled in the art can be made to the configurations or details of the present invention.

INCORPORATION BY REFERENCE

This application is based upon and claims the benefit of priority from Japanese application No. 2017-048915, filed on Mar. 14, 2017, the disclosure of which is incorporated herein in its entirety by reference.

INDUSTRIAL APPLICABILITY

As described above, according to the present invention, intrinsic parameters, which include a lens distortion coefficient, and extrinsic parameters can be estimated with high accuracy. The present invention is effective in fields where estimation of camera parameters is desired, for example such as robot control and image processing.

DESCRIPTION OF REFERENCE SIGNS

10 Camera parameter estimation apparatus
20 Parameter calculation unit
21 Division processing unit
22 Partial parameter calculation unit
23 Remaining parameter calculation unit
30 Parameter optimization unit
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A camera parameter estimation apparatus for estimating camera parameters when an object is photographed by a camera, the camera parameter estimation apparatus comprising:
a parameter calculation unit configured to divide an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and to calculate optimal solution candidates in the respective plurality of subproblems; and
a parameter optimization unit configured, with the optimal solution candidates as initial values, to find an optimal solution for minimizing an error obtained by the error function, and to output the found optimal solution as an optimal camera parameter.

2. The camera parameter estimation apparatus according to claim 1,
wherein the camera parameters include extrinsic parameters related to the outside of the camera,
the parameter calculation unit calculates an optimal solution candidate for, among the plurality of subproblems, one subproblem that depends on only some of the extrinsic parameters, and
the parameter calculation unit also calculates, based on the optimal solution candidates that were calculated and the three-dimensional points and the two-dimensional points, optimal solution candidates for subproblems for which optimal solution candidates have not yet been calculated.

3. The camera parameter estimation apparatus according to claim 1,
wherein the parameter optimization unit, based on the optimal solution candidates that were calculated by the parameter calculation unit and the three-dimensional points and the two-dimensional points, finds an optimal solution for minimizing the error by optimizing the error function.

4. The camera parameter estimation apparatus according to claim 2,
wherein the extrinsic parameters include either one or both of position and rotation in a three-dimensional space of the camera, and
the camera parameters include, in addition to the extrinsic parameters, intrinsic parameters related to the inside of the camera, and the intrinsic parameters include at least one of, in the camera, a lens focal length, an optical center, an aspect ratio, a shear coefficient, and a lens distortion coefficient.

5. A camera parameter estimation method of estimating camera parameters when an object is photographed by a camera, the camera parameter estimation method comprising:
(a) dividing an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and calculating optimal solution candidates in the respective plurality of subproblems; and
(b) with the optimal solution candidates as initial values, finding an optimal solution for minimizing an error obtained by the error function, and outputting the found optimal solution as an optimal camera parameter.

6. A non-transitory computer-readable recording medium that includes a program recorded thereon for, with a computer, estimating camera parameters when an object is photographed by a camera, the program including instructions that cause the computer to carry out:
(a) dividing an error function representing a transformation between at least six sets of three-dimensional points relating to the object and two-dimensional points on an image that correspond to the respective three-dimensional points into a plurality of subproblems based on dependency among the camera parameters and the flatness of distribution of the three-dimensional points, and calculating optimal solution candidates in the respective plurality of subproblems; and
(b) with the optimal solution candidates as initial values, finding an optimal solution for minimizing an error obtained by the error function, and outputting the found optimal solution as an optimal camera parameter.

7. The camera parameter estimation method according to claim 5,
wherein the camera parameters include extrinsic parameters related to the outside of the camera, and
in the (a),
an optimal solution candidate is calculated for, among the plurality of subproblems, one subproblem that depends on only some of the extrinsic parameters, and
also, based on the optimal solution candidates that were calculated and the three-dimensional points and the two-dimensional points, optimal solution candidates are calculated for subproblems for which optimal solution candidates have not yet been calculated.

8. The camera parameter estimation method according to claim 5,
wherein in the (b), an optimal solution for minimizing the error is found by optimizing the error function based on the optimal solution candidates that were calculated in the (a) and the three-dimensional points and the two-dimensional points.

9. The camera parameter estimation method according to claim 7,
wherein the extrinsic parameters include either one or both of position and rotation in a three-dimensional space of the camera, and
the camera parameters include, in addition to the extrinsic parameters, intrinsic parameters related to the inside of the camera, and the intrinsic parameters include at least one of, in the camera, a lens focal length, an optical center, an aspect ratio, a shear coefficient, and a lens distortion coefficient.

10. The non-transitory computer-readable recording medium according to claim 6,
wherein the camera parameters include extrinsic parameters related to the outside of the camera, and
in the (a),
an optimal solution candidate is calculated for, among the plurality of subproblems, one subproblem that depends on only some of the extrinsic parameters, and
also, based on the optimal solution candidates that were calculated and the three-dimensional points and the two-dimensional points, optimal solution candidates are calculated for subproblems for which optimal solution candidates have not yet been calculated.

11. The non-transitory computer-readable recording medium according to claim 6,
wherein in the (b), an optimal solution for minimizing the error is found by optimizing the error function based on the optimal solution candidates that were calculated in the (a) and the three-dimensional points and the two-dimensional points.

12. The non-transitory computer-readable recording medium according to claim 10,
wherein the extrinsic parameters include either one or both of position and rotation in a three-dimensional space of the camera, and
the camera parameters include, in addition to the extrinsic parameters, intrinsic parameters related to the inside of the camera, and the intrinsic parameters include at least one of, in the camera, a lens focal length, an optical center, an aspect ratio, a shear coefficient, and a lens distortion coefficient.

* * * * *